Dec. 5, 1961 R. U. MITSUYASU 3,011,800
TOW BAR
Filed Sept. 4, 1959 3 Sheets-Sheet 1
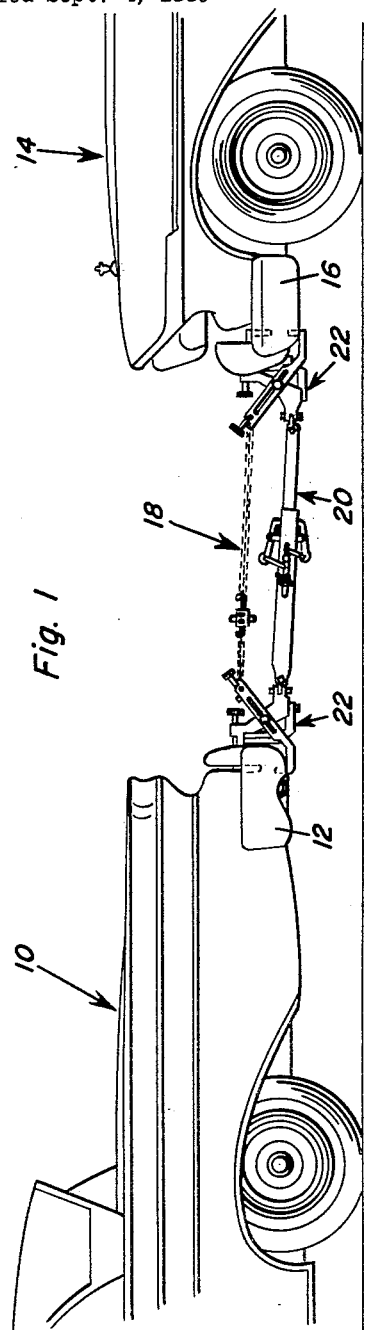
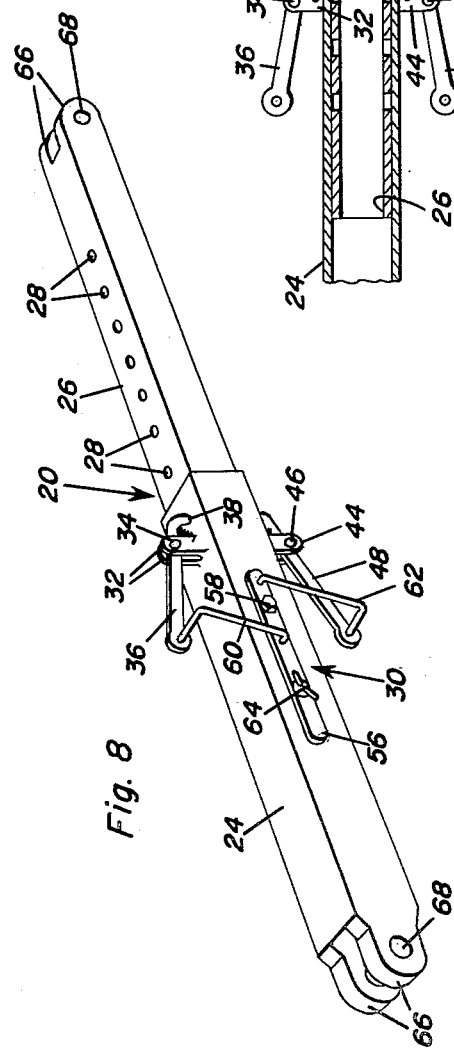
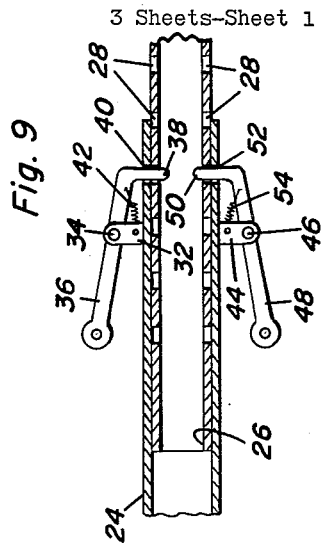
Robert U. Mitsuyasu
INVENTOR.

Dec. 5, 1961  R. U. MITSUYASU  3,011,800
TOW BAR
Filed Sept. 4, 1959  3 Sheets-Sheet 2
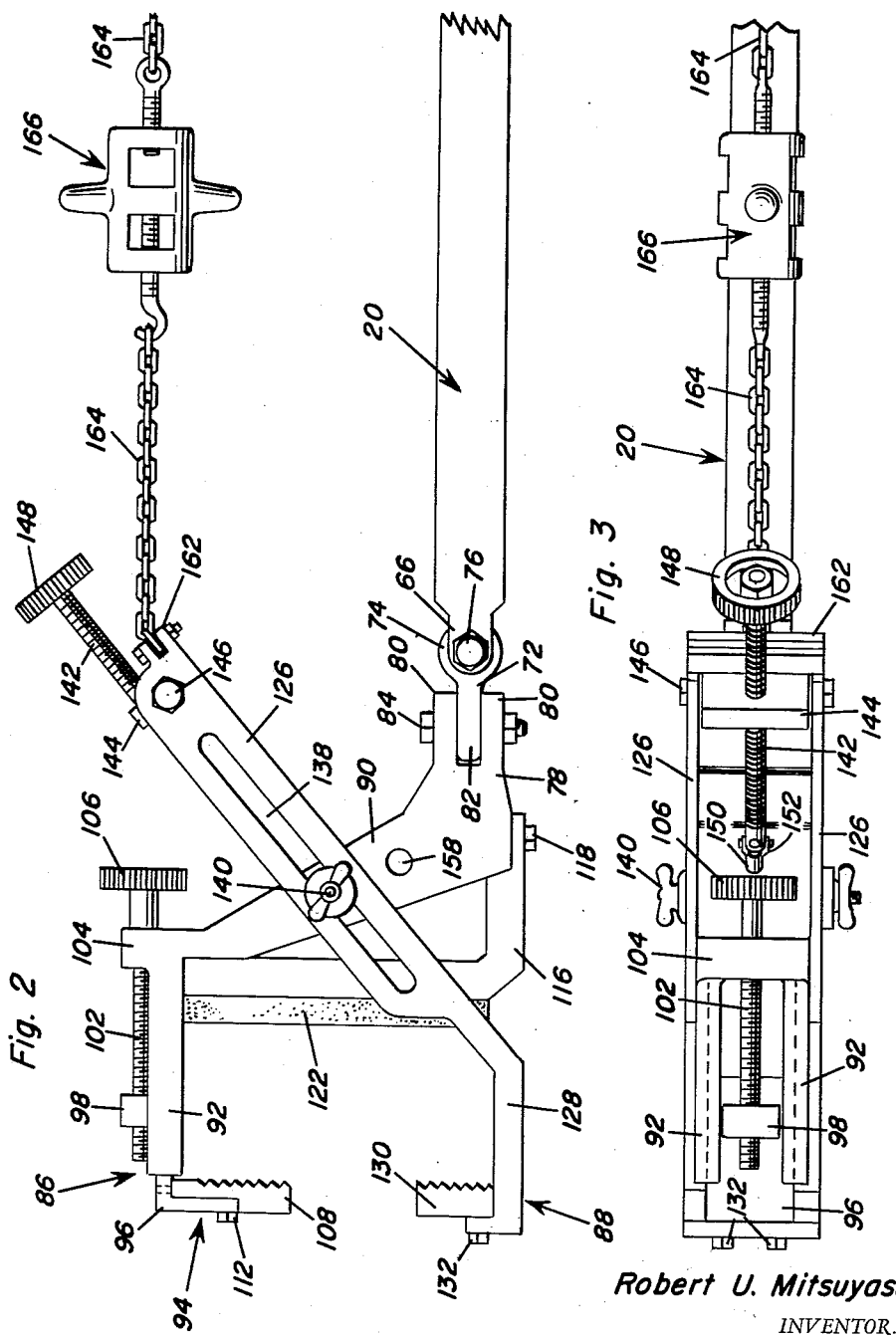
Robert U. Mitsuyasu
INVENTOR.
BY Clarence A. O'Brien
and Harvey B. Jacobson
Attorneys Dec. 5, 1961  R. U. MITSUYASU  3,011,800
TOW BAR
Filed Sept. 4, 1959  3 Sheets-Sheet 3
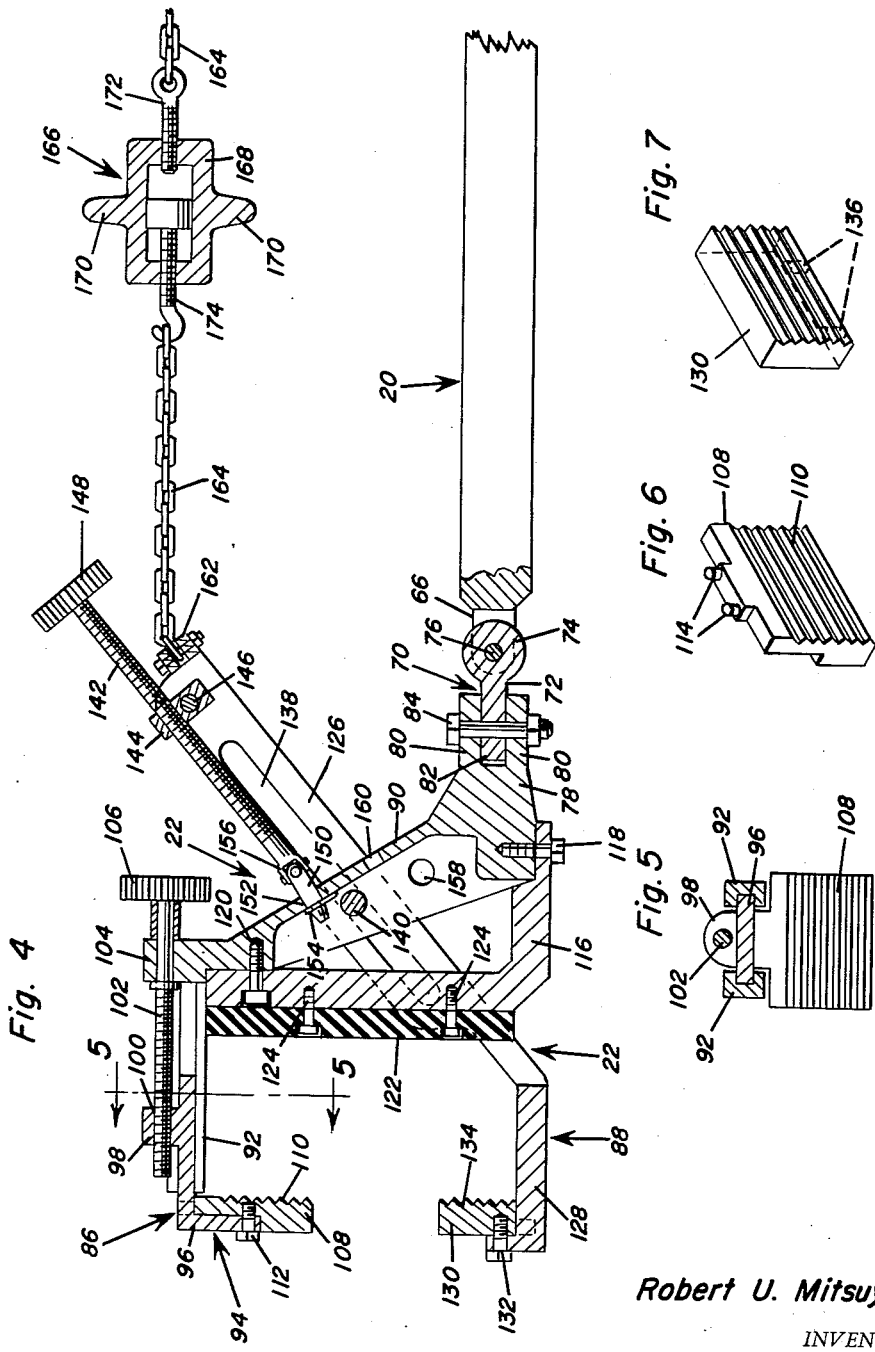
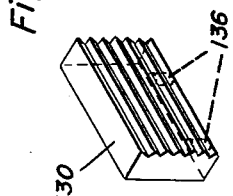
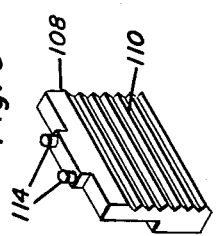
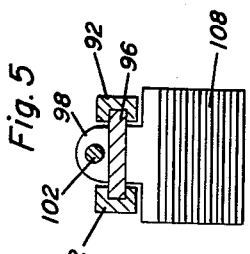
Robert U. Mitsuyasu
INVENTOR.

United States Patent Office 3,011,800
Patented Dec. 5, 1961

3,011,800
TOW BAR
Robert U. Mitsuyasu, 91—710 Makule Road,
Ewa Beach, Oahu, Hawaii
Filed Sept. 4, 1959, Ser. No. 838,213
8 Claims. (Cl. 280—482)

This invention relates in general to new and useful improvements in vehicle towing devices, and more specifically to a novel tow bar for attachment to the bumpers of two vehicles to interconnect the same for towing.

Due to continuous design changes and the fact that all vehicles are not made by the same manufacturer, the bumpers on the various vehicles are of different sizes, shapes and heights. Accordingly, it becomes difficult to provide a suitable towing device which may be readily attached to two vehicles of widely different designs. In view of this, it is the primary object of this invention to provide a novel tow bar which has novel clamping means which may be readily adjusted to be adapted to fit the bumpers of all existing vehicles so that the tow bar permits the towing of any one vehicle by another.

Another object of the invention is to provide a novel tow bar for vehicles, the tow bar having bumper clamp means at opposite ends thereof, the bumper clamp means at each end of the tow bar including a fixed upper clamp member and a pivotally mounted lower clamp member, the clamp members having crossed support portions and the support portions of the lower clamp members being interconnected by a tension member so that the lower clamp member is urged into a bumper clamping position at all times.

Another object of this invention is to provide a bumper clamp assembly for a tow bar, the bumper clamp assembly including a fixed upper clamp member and a pivotally mounted lower clamp member, the upper clamp member including a support portion which extends diagonally upwardly and which has attached thereto an upstanding part for engaging the face of a bumper, the fixed upper clamp member also including a longitudinally adjustable jaw for movement towards and away from the bumper face engaging member so that the upper clamp member may be readily adapted to bumpers of all thicknesses, and the lower clamp member including a support portion which is disposed in cross relation to the support portion of the upper clamp member and being slidable and pivotable relative thereto so that the lower clamp member may be adjusted to fit bumpers of all thicknesses and all heights.

A further object of the invention is to provide a novel tow bar which includes an elongated tow pole and a pair of bumper clamp members, the bumper clamp members being connected to the tow pole at the opposite ends thereof through articulated connections which permits the desired maneuverability between the towing vehicle and the towed vehicle.

A still further object of the invention is to provide a novel tow pole for a tow bar, the tow pole being formed in telescoped sections so that it may be extended as required, and there being provided novel latch means for retaining the sections in their extended positions, the latch means including a pair of opposed latch pins which are pivotally mounted and which are actuated by a single operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary elevational view showing two vehicles connected together by the tow bar which is the subject of this invention;

FIGURE 2 is an enlarged fragmentary elevational view showing the details of one end of the tow bar removed from a vehicle;

FIGURE 3 is an enlarged plan view of the one end of the tow bar of FIGURE 2 and shows further the details thereof;

FIGURE 4 is an enlarged longitudinal sectional view taken through the bumper clamp assembly at one end of the tow bar and shows the specific details thereof;

FIGURE 5 is an enlarged fragmentary transverse sectional view taken substantially upon the plane indicated by the section line 5—5 of FIGURE 4 and shows the manner in which the jaw of the upper clamp member is adjustably mounted for engaging bumpers of all thicknesses;

FIGURE 6 is an enlarged perspective view of the jaw of the upper clamp member removed from its holder;

FIGURE 7 is an enlarged perspective view of the jaw of the lower clamp member;

FIGURE 8 is an enlarged perspective view of the tow pole and shows the details thereof; and FIGURE 9 is an enlarged fragmentary longitudinal sectional view taken through the central portion of the tow pole and shows further the details of the latch means for holding the sections of the tow pole in extended positions.

Referring now to the drawings in detail, it will be seen that there is illustrated a tow bar, which is the subject of this invention, the tow bar being in use interconnecting two vehicles. The towing vehicle is referred to by the numeral 10 and has a rear bumper 12. The towed vehicle is referred to by the numeral 14 and has a front bumper 16. The tow bar, which is referred to in general by the reference numeral 18, is connected to the bumpers 12 and 16 and extends between the vehicles 10 and 14 so that the vehicle 10 may tow the vehicle 14 through the tow bar 18.

The tow bar 18 includes a centrally located tow pole, generally referred to by the numeral 20 and bumper clamp assemblies, generally referred to by the numeral 22, the bumper clamp assemblies 22 being identical and being secured to opposite ends of the tow pole 20.

The tow pole 20 includes two telescoped sections 24 and 26 of which the section 24 is the largest and into which is received the section 26. Although either of these sections 24 and 26 may be disposed forwardmost, the tow pole 20 is illustrated with the tow pole section 24 disposed forwardmost. The section 26 is provided with a plurality of longitudinally spaced openings 28 in the upper and lower surfaces thereof. The tow pole section 24 is provided with suitable latch means, generally referred to by the numeral 30, which cooperates with the openings 28 to facilitate the securing of the section 26 in its extended position.

The latch means 30 includes a pair of ears 32 extending upwardly from the upper surface of he section 24. The ears 32 carry pivot pins 34 which in turn pivotally support a lever 36 having an offset end portion 38 which extends through an opening 40 in the upper surface of the section 24 and projects through one of the openings 28. A spring 42 extends between the lever 36 and one of the ears 32 and urges the lever 36 to a latching position.

A second pair of ears 44 depend from the underside of the section 24 and carry a pivot pin 46 on which there is pivotally mounted a lever 48 having an end 50 which extends through an opening 52 in the underside of the section 24 and into one of the openings 28. The end 50 opposes the end 38, as is best illustrated in FIGURE 9. A spring 54 extends between the lever 48 and one of the ears 44 and urges the lever 48 towards a latching position.

In order to facilitate the simultaneous pivotal movement of the levers 36 and 48, an operating lever 56 is pivotally mounted on the side of the section 24 by means of a pivot pin 58. A first link 60 extends between an intermediate portion of the operating lever 56 adjacent the pivot pin 58 and is connected to the remote end of the lever 36. A similar link 62 extends between an end portion of the lever 56 adjacent the pivot pin 58 and is connected to a remote end of the lever 48. Thus when the lever 56 is pivoted in a counterclockwise direction, as viewed in FIGURE 8, the levers 36 and 48 will be pulled towards the section 24 so as to move the end portions 38 and 50 to released positions. A removable fastener 64 retains the lever 56 in a latched position.

The ends of the sections 24 and 26 are provided with longitudinally projecting ears 66 which are disposed in vertical planes. The ears 66 at the opposite ends of the sections 24 and 26 are spaced apart the same distance and are provided with transverse bores 68.

The ears 66 are parts of articulated connections, generally referred to by the numeral 70, between the tow pole 20 and the bumper clamp assemblies 22. Each articulated connection 70 includes an intermediate connector 72 which includes a vertically disposed end portion 74 positioned between a pair of the ears 66 and pivotally mounted for movement about the horizontal longitudinal axis of the pivot pin 76 extending through the aligned bores 68 formed in the ears 66.

The individual bumper clamp assembly 22 includes a drawbar part 78 which has a pair of horizontally disposed ears 80 which are vertically spaced and between which a horizontal part 82 of the connector 72 is disposed. A vertical pivot pin 84 extends through the ears 80 and the horizontal part 82 of the connector 72 and permits the connector 72 to pivot about the vertical axis of the pivot pin 84. Thus relative vertical and horizontal pivoting between each of the bumper clamp assemblies 22 and the tow pole 20 is facilitated.

The individual bumper clamp assembly 22 is formed of a fixed upper clamp member, generally referred to by the numeral 86 and a lower adjustable clamp member, generally referred to by the numeral 88. The upper clamp member 86 includes an upwardly and outwardly sloping support 90 which terminates at its lower end in the drawbar part 78. The fixed upper clamp member 86 also includes a guideway 92 which extends from the upper end of the support portion 90 in a direction remote from the tow pole 20. The guide portion 92 is formed of a pair of opposed channels, as is best illustrated in FIGURE 5. An adjustable jaw unit, generally referred to by the numeral 94 is carried by the guideway 92. The adjustable jaw unit 19 includes an annular carrier 96 which has secured to the horizontal leg thereof an upstanding ear 98 with a threaded bore 100. The ear 98 has threadedly engaged therein a feed screw 102 which is carried by an upstanding part 104 of the fixed upper jaw member 86. The feed screw 102 is provided with a suitable knob 106 to facilitate turning thereof to feed the carrier 96 longitudinally and thus adjust the jaw unit 94.

An upper jaw 108 is carried by the carrier 96 in vertical depending relation. The jaw 108 is provided with a bumper engaging serrated face 110 to facilitate the proper gripping of a bumper. The jaw 108 is secured in place by fasteners 112 and, as is best illustrated in FIGURE 6, is provided with upwardly projecting pins 114 which extend into the horizontal leg of the carrier 96 to facilitate the positioning of the jaw 108. It will be readily apparent that the mounting of the jaw 108 is such that it may engage bumpers of all thicknesses.

The upper clamp member 86 also carries a generally L-shaped member 116 which is secured to the drawbar part 78 by fasteners 118 and to the upper part of the support portion 90 by fasteners 120. A cushion pad 122 overlies a vertical portion of the L-shaped member 116 and is secured in place by fasteners 124 which are recessed. The cushion member 124 functions as a bumper engaging pad or plate.

The lower clamp member 88 includes an elongated bifurcated support portion 126 which slopes upwardly. The support portion 126 terminates at its lower end in a mounting portion 128 which supports a lower jaw 130, the jaw 130 being removably secured to the lower portion 128 by suitable fasteners 132. The jaw 132 has a horizontally serrated face 134 to facilitate the gripping of the lower part of a bumper. The jaw 130 is also provided with depending aligning pins 136, as is best shown in FIGURE 7, which extend into the support portion 128.

The support portions 126 are provided with elongated slots 138. The support portions 126 are disposed in crossed relation with respect to the support portion 90 and are connected to the support portion 90 for both pivotal and sliding movement by means of a horizontal pivot pin 140 which extends through the slot 138.

The sliding movement of the support portions 126 relative to the support portion 90 is controlled by a feed screw 142 which is threadedly engaged in a nut member 144 which is pivotally connected to the support portions 126 by a pin 146. The upper end of the feed screw 142 is provided with a knob 148 to facilitate turning thereof.

The lower end of the feed screw 142 is provided with an extension 150 which extends through a bore 152 in the support portion 90 and is retained in place by a lock member 154. The extension 150 is connected to the main part of the feed screw 142 by a universal connection 156. Thus the support portions 126 are free to pivot about the pin 140 and at the same time may be slidably adjusted with respect to the support portion 90.

At this time it is pointed out that the support portion 90 is provided with a second pair of openings 158 for the pin 140 and a second opening 160 for the extension 150. Thus the lower clamp member 88 may be bodily vertically adjusted when a next vertical adjustment is necessary.

The upper ends of the support portions 126 carry a fitting 162 to which a chain 164 is connected. The two chains from the two bumper clamp assemblies 22 are connected by a turnbuckle assembly, generally referred to by the numeral 166. The turnbuckle 166 includes a housing 168 having projecting ears 170 to facilitate the rotation thereof. An eye bolt 172 is threadedly engaged at one end of the housing 168 and terminally receives one of the chains 164. A hook bolt 174 is threadedly engaged in the opposite end of the member 168 and adjustably receives a link of its associated chain 164. It will be readily apparent that the turnbuckle assembly 166 serves to tension the chains 164, which in turn, serve to urge the lower clamp members 88 into bumper clamping positions and to retain the clamp members 88 in their bumper clamping positions. The upper clamp members 86, of course, are retained in their clamping position by both gravity and the adjustment of the jaws 108.

From the foregoing, it will be readily apparent that there has been devised a novel tow bar which may be readily adjusted to fit any bumper, thus facilitating the connection of two vehicles of varied construction. Further, the tow pole 20 being adjustable permits the proper spacing of the vehicles for towing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tow bar assembly comprising a tow pole having bumper clamps at opposite ends thereof, each of said clamps including a fixed upper clamp member and a pivotally mounted lower clamp member, said clamp members having crossed support portions, and a tension member extending between and connected to said lower clamp member support portions and urging said lower clamp members to bumper clamping positions.

2. The tow bar assembly of claim 1 wherein said upper clamp members include longitudinally adjustable jaws.

3. The tow bar assembly of claim 1 wherein each lower clamp member is slidable relative to a respective upper clamp member.

4. The tow bar assembly of claim 1 wherein said upper clamp members include longitudinally adjustable jaws, and each lower clamp member is slidable relative to a respective upper clamp member.

5. The tow bar assembly of claim 1 wherein each clamp member has an articulated connection with said tow pole.

6. A tow bar assembly comprising a tow pole having bumper clamps at opposite ends thereof, each of said clamps including a fixed upper clamp member and a pivotally mounted lower clamp member, said clamp members having crossed support portions, and a tension member extending between and connected to said lower clamp member support portions and urging said lower clamp members to bumper clamping positions, said tow pole being extensible in length and being formed of telescoped sections, and latch means locking said sections in adjusted relation, said tension member including means enabling the effective length of said tension member to be selectively adjusted to conform to the adjusted length of the tow pole.

7. In combination, a tow pole assembly comprising a tow pole, a clamp means at each end of said tow pole adapted for engagement with the vehicle bumper, said tow pole being extensible in length and being formed of telescoped sections, latch means locking said sections in adjusted relation, each of said sections being tubular and the outer section including a pair of transversely aligned openings, the inner section including longitudinally spaced pairs of transversely aligned openings, the openings of said inner section being registrable with the openings of the outer section, a pair of levers pivotally secured to the outermost of said telescoped sections for movement about axes extending transversely of said tow pole, each of said levers having a laterally directed free end portion receivable through one of said openings forming said outer section, an operating lever pivoted to said outer section intermediate the opposite ends of said operating lever for movement about an axis extending transversely of said pole, and link means connecting the levers of said pairs of levers to said operating lever on opposite sides of the axis of rotation of said operating lever whereby oscillation of the latter will simultaneously urge said end portions in like movement toward and away from engagement with said registered openings.

8. The combination of claim 7 including means normally yieldably urging said levers to positions with said end portions disposed through said registered openings.

References Cited in the file of this patent

UNITED STATES PATENTS

| | | |
|---|---|---|
| 1,435,064 | Holmes | Nov. 7, 1922 |
| 1,594,305 | Lattin | July 27, 1926 |
| 2,268,181 | Bolton | Dec. 30, 1941 |
| 2,497,234 | Mylie | Feb. 14, 1950 |
| 2,518,816 | Powers | Aug. 15, 1950 |
| 2,572,341 | Hoffman | Oct. 23, 1951 |
| 2,747,893 | Strand | May 29, 1956 |
| 2,818,276 | Sprang | Dec. 31, 1957 |